March 22, 1966  E. T. SKINNER  3,241,207
BAND FORCE PIPE CLAMP
Filed Oct. 4, 1963

EDWARD T. SKINNER
INVENTOR.

BY

United States Patent Office 3,241,207
Patented Mar. 22, 1966

3,241,207
BAND FORCE PIPE CLAMP
Edward T. Skinner, P.O. Box 13762, Dallas, Tex.
Filed Oct. 4, 1963, Ser. No. 313,990
4 Claims. (Cl. 24—279)

This invention relates to a pipe clamp and more particularly to a strap type structure for encompassing a pipe to close a leak therein. In a more specific aspect, the invention relates to a structure in which band type forces are exploited.

Various types of band type clamps have been provided with means for adjustably tensioning the same around a pipe for closure of leaks. While such devices will seal a leak section of a pipe, application of substantial pressure to the band has often caused collapse of the wall of the pipe in the zones opposite the leak. It is an object of the present invention to overcome such deficiencies in prior art systems and to provide for a band type structure of adjustable tension which is characterized by the utilization of true band forces. By this means, substantially uniform distribution of radially directed forces is maintained.

In accordance with the present invention there is provided a flat band of flexible material having a resilient pad covering a mid-section on an inner face thereof. A pair of rigid lugs each has slotted transversely extending bosses thereon with the band wrapped around the bosses at the ends thereof with the inner face contacting the surface of the rods and with the bosses extending through the band. A tensioning bolt is positioned in slots in the bosses and bears against oppositely facing surfaces of protrusions in contact zones of extent limited to that portion of the bosses lying between the band and a zone in the region of the axis of the bolt.

Figure 1:
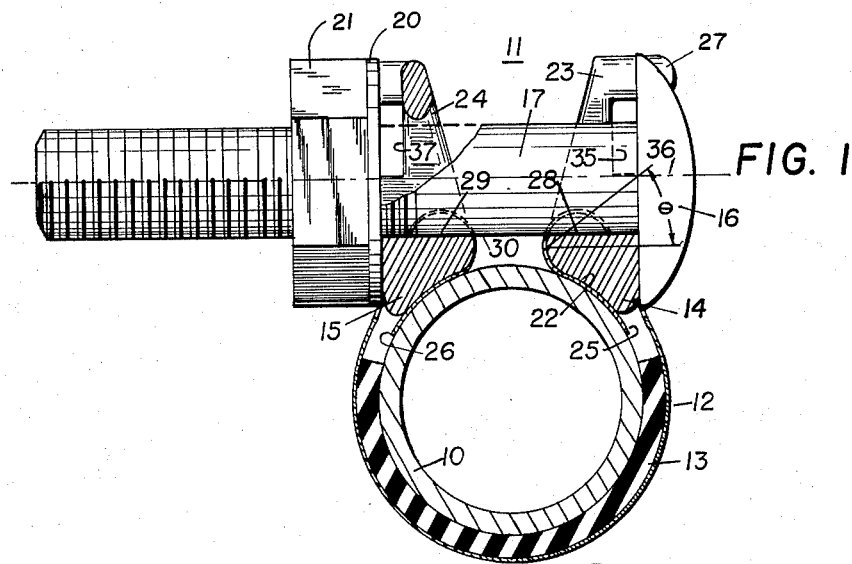
Figure 2:
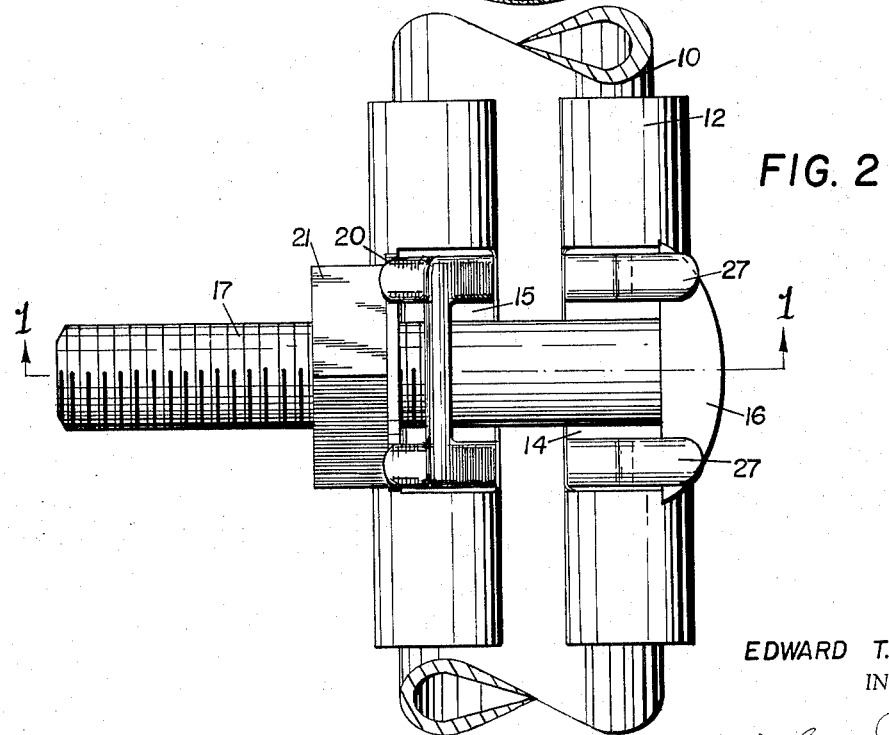

For a more complete understanding of the present invention and for further objects and advantages thereof, reference may now be had to the following description taken in conjunction with the accompanying drawings in which:

FIGURE 1 is an enlarged sectional view of a clamp installation taken along lines 1—1 of FIGURE 2, and FIGURE 2 is an end view of the clamp before assembly.

In the operation of a pipe repair clamp, a pad of resilient material is pressed against the leak or break in the pipe by a relatively rigid band of sheet metal. The band is pulled tight to compress the pad against the pipe by means of a tightening device such as a bolt and a nut. Where the band is flexible, a rigid lug must be used to provide a means for applying uniform pressure on the area of the band covered by the pad. Since the band is flexible, the lug is not held in a fixed relative position either with respect to the band or the pipe. The application of the tightening force and the manner in which tightening forces are exerted on the pipe become most important. The present invention provides special construction on the lugs to prevent application of crushing forces to the pipe.

Referring to the drawings, FIGURE 1 is an enlarged sectional view showing a clamp of the present invention installed on a pipe 10. The clamp 11 comprises a flexible metallic band 12 having a rubber mat 13 secured to one face thereof and brought to bear against the surface of the pipe 10. The ends of the band 12 encompass two lugs 14 and 15. Lug 14 has a boss structure including two upwardly extending arms for receiving the head 16 of a bolt 17. For the purpose of illustrating the present invention, the body of the bolt 17 has been shown dotted, with the head 16, and a washer 20 and a nut 21 being shown in plan view. Lugs 14 and 15 are tear drop in shape and have curved surfaces, such as the surface 22, which substantially conform with the curvature of the pipe to which the clamp is to be applied. Band 12 is pierced to permit bosses 23 and 24 to pass therethrough. Bosses 23 and 24 are upstanding extensions of the lugs 14 and 15. The ends 25, and 26 of the band 12 wrap around the lugs and are positioned under the lugs between the surface of the lugs such as surface 22 and the pipe to provide clamping action therebetween.

The present invention is directed to the improvement in the lug configuration such that the forces applied to the band 12 will be more nearly strap-like or band-like than has heretofore been possible. It will be noted that the bolt head 16 is maintained in position such that it cannot slip out of the boss 23 by ears 27. Further, the upper surface of lugs 14 and 15 is flattened as at points 28 and 29, to bring the lower margin 30 on the bolt as near to the surface of the pipe 10 as possible. The bolt also extends through a hole in the boss 24. The bosses 23 and 24 are shaped so that a limited bearing surface is provided. More particularly, the boss 23 is relieved in section 35 so that the head 16 bears against boss 23 only in that limited zone lying below the axis 36 of the bolt 17. In a similar manner, the lug 24 is relieved in the zone 37 so that the washer 20 bears against the surface of the lug 24 only below the axis of the bolt 17. Thus the lugs are relieved above the axes of the openings therein so that the bearing surfaces terminate at the center of each lug opening and extend toward the respective bars on which the lugs are mounted. Ears 28 on lug 24 serve to keep the bolt against the surface 29.

In operation, the pad 13 is placed against the zone in the pipe 10 in which there is a leak. The band is then pulled tight around the pipe by serving the nut 20 onto the bolt 17. The forces acting on the lugs 14 and 15 are as follows:

(1) The bolt force acts to pull the two lugs together;
(2) The band force resists the bolt force; and
(3) The friction force is developed between the pipe wall and the surface such as surface 22 of the lugs.

These foregoing forces tend to create a twisting force combination to the lugs. As a result, there is developed, in conventional type lugs, a considerable radially directed force down against the wall of the pipe 10. This twisting force, in conventional pipe clamps, has been found to be sufficient to crush the pipe wall inwardly. By undercutting the lugs at their upper portions such that the distance horizontally from the center of the front nose of the lug to the back of the lug boss is equal to or greater than the distance from the center of the front nose of the lug to the low lip of the lug boss undercut, the twisting force combination can be controlled to provide a force balance, insuring an adequate force against the pipe to prevent the sheet metal band from slipping back around the lug and at the same time preventing crushing of the pipe wall.

Ideally, in accordance with the present invention, the angle $\theta$ of FIGURE 1 will be maintained less than 45 degrees. When this is the case, the distribution of the clamping forces over a substantial area of the pipe 10 avoids collapse of the pipe.

A plurality of bolts may be operative at spaced points along the length of a given clamp, but in each case, the application of forces is limited to the zone lying between the surface of the pipe and a line in the region of the axis of the bolt.

If the lugs are relieved to a greater degree than the axis of the bolt 17, bending forces are developed in the bolt which cause undesirable distortion. The ears on the lugs tend to keep the bolt in contact with the tops of the longitudinal lug surfaces. The clamps operate satisfactorily even though sufficient play is present to permit the bolt to be spaced slightly from the upper lug surfaces.

Having described the invention in connection with certain specific embodiments thereof, it is to be understood that further modifications may now suggest themselves to those skilled in the art and it is intended to cover such modifications as fall within the scope of the appended claims.

What is claimed is:

1. In a pipe clamp design having a flexible, centrally padded strap with an in-turned loop at each of the ends for encompassing a pipe having generally cylindrical pipe surfaces with a clamp member retained in each loop and adapted to confront a mating clamp member, the combination therewith which comprises:
    (a) an upstanding lug on each said clamp member extending through intermediate portions of said strap adjacent said ends, each said lug being pierced to provide a bolt receiving hole therethrough parallel to a tangent to said pipe midway between said clamp member, and
    (b) a headed bolt in the lugs for forcing the clamp members together when a nut is served onto said bolt, said lugs being planar below the axis of said bolt and relieved only from and above the axis of said bolt to limit bearing surface engagement of said bolt, bolt head, and nut on said lugs to that portion lying between about the center of each said hole and said pipe, said bolt, bolt head, and nut being dimensioned so that band tightening forces applied thereby to the clamp members will be substantially strap-like to prevent application of crushing forces to an encompassed pipe.

2. In a pipe clamp wherein a flexible strap has an in-turned loop at each end encompassing a rigid bar and wherein each loop is impaled by a lateral lug with a bolt through a hole in said lugs coupling such lugs to force the loops and the bars into juxtaposed relationship, the improvement which comprises:
    (a) means on each lug for maintaining said bolt in at least near surface contact with the outer surface of said bars, and
    (b) structure forming bolt contact bearing surfaces on said lugs which extend from said bars only to a line about at the center of said holes.

3. A lug for transmitting a tensile force to a flexible pipe repair clamp band from a lug bolt which comprises:
    (a) an elongated bar having an inner surface of configuration corresponding with a segment of said pipe to provide a longitudinally and circumferentially extending contact zone with the surface of said pipe, and
    (b) a lateral lug perpendicular to said bar having an opening therethrough for said lug bolt and a planar bearing surface for said bolt substantially tangent to said pipe, the axis of said opening being mutually perpendicular with respect to said bar and to said lug, said bearing surface terminating at the center of said opening and extending toward said bar.

4. A lug for transmitting a tensile force to a flexible pipe repair clamp band from a lug bolt which comprises:
    (a) an elongated bar having an inner surface of configuration corresponding with a segment of said pipe to provide a longitudinally and circumferentially extending contact zone with the surface of said pipe, and
    (b) a lateral lug perpendicular from the outer surface of said bar having an opening therethrough for said lug bolt and a planar bearing surface for said bolt perpendicular to said opening substantially tangent to said pipe, the axis of said opening being mutually perpendicular with respect to said bar and to said lug, said bearing surface terminating at the center of said opening and extending toward said bar.

References Cited by the Examiner
UNITED STATES PATENTS

| | | | |
|---|---|---|---|
| 1,596,944 | 8/1926 | Philbrook | 24—285 |
| 1,907,889 | 5/1933 | Stauffer. | |
| 2,908,061 | 10/1959 | Adams | 24—279 |
| 2,977,995 | 4/1961 | Walpole | 138—99 |
| 3,089,212 | 5/1963 | Graham et al. | 24—279 |

WILLIAM FELDMAN, *Primary Examiner.*

DONLEY J. STOCKING, *Examiner.*